H. N. PATRICK.
CULTIVATOR ATTACHMENT.
APPLICATION FILED OCT. 16, 1907.
907,278.
Patented Dec. 22, 1908.
2 SHEETS—SHEET 1.
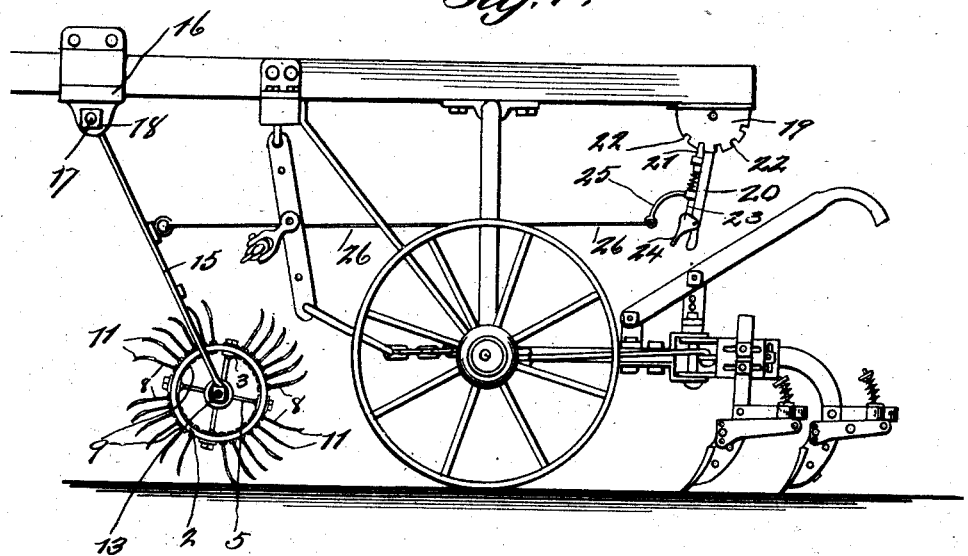
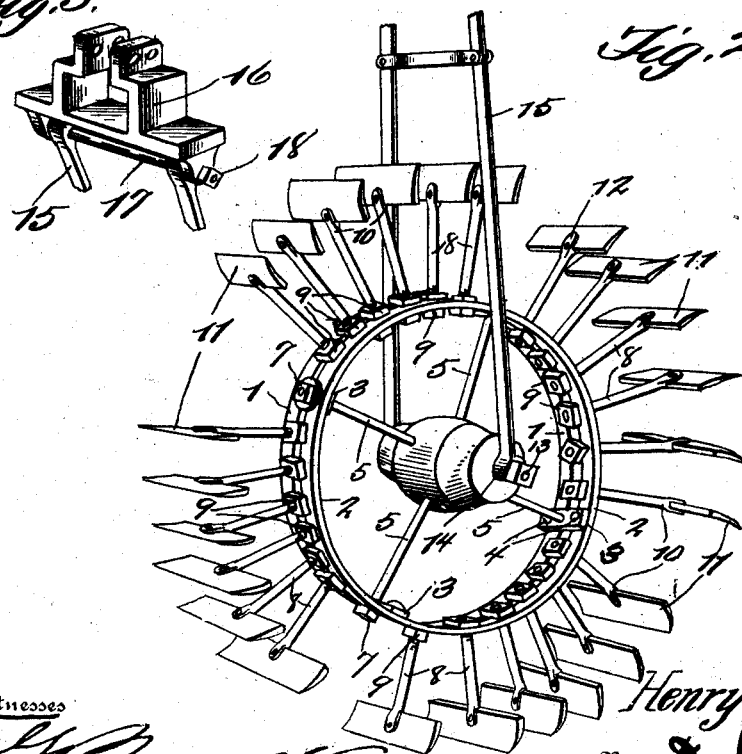

H. N. PATRICK.
CULTIVATOR ATTACHMENT.
APPLICATION FILED OCT. 16, 1907.
907,278.
Patented Dec. 22, 1908.
2 SHEETS—SHEET 2.
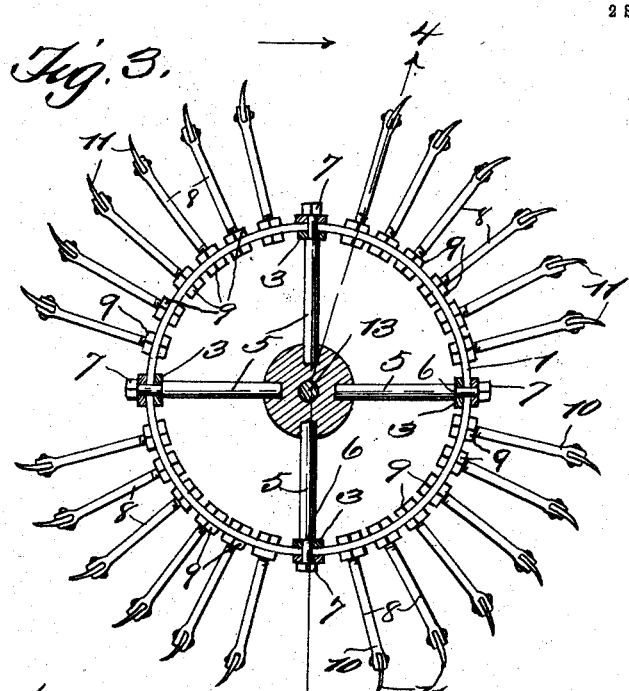
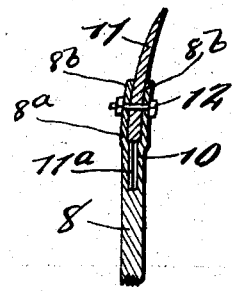
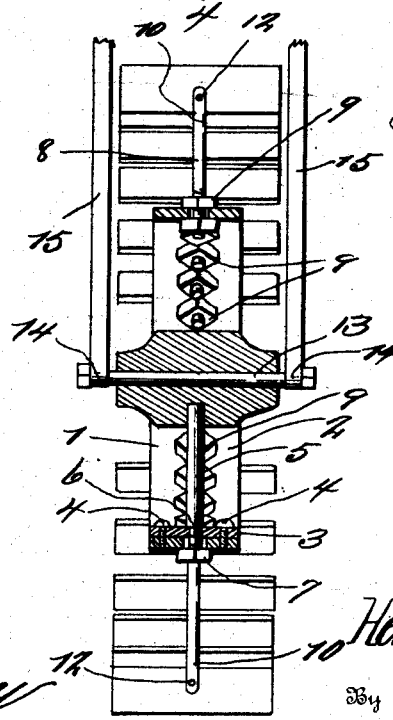
Inventor
Henry N. Patrick.
By D. Swift & Co.
Attorneys
Witnesses

UNITED STATES PATENT OFFICE.

HENRY N. PATRICK, OF ALBA, TEXAS.

CULTIVATOR ATTACHMENT.

No. 907,278.    Specification of Letters Patent.    Patented Dec. 22, 1908.

Application filed October 16, 1907. Serial No. 397,605.

*To all whom it may concern:*

Be it known that I, HENRY N. PATRICK, a citizen of the United States, residing at Alba, in the county of Wood and State of Texas, have invented a new and useful Cultivator Attachment; and I do hereby declare the following to be a full, clear, and exact description of the invention, such as will enable others skilled in the art to which it appertains to make and use the same.

This invention pertains to cultivator implements, and to that class of implements used especially for cultivating cotton plants, and the invention in its broadest aspect, resides especially and essentially in a cotton chopper attachment for cultivators, as will be hereinafter specifically set forth.

A further, and most particular object of the invention, dwells in the new, useful and novel construction of the attachment, which comprises a pair of annular rings or rims disposed parallel with each other, and slightly spaced apart, cotton chopper blades having shanks, which are held removably and adjustably in the space between the rings or rims, as will be clearly evident from the drawings.

The invention creates a further novel element of construction which consists of a plate for holding the rings or rims spaced apart, through which plates the spokes of the device extend, and to the outer ends of said spokes nuts are connected for the purpose of securely holding the spokes in their proper position.

The invention comprises further objects and combinations of elements which will be hereinafter more fully described, shown in the accompanying drawings, and the novel features thereof will be pointed out by the appended claim.

The features and elements and the arrangement thereof, for accomplishing the objects of the invention may be changed and varied, that is to say, in a practical application of the device, with the understanding that the changes and variations accruing from said application are limited to the scope of the appended claim.

To obtain a full and correct understanding of the details of construction, combination of features, elements and advantages, reference is to be had to the hereinafter set forth description and the accompanying drawings in connection therewith, wherein—

Figure 1 is a side elevation of a cultivator, illustrating the cotton chopper or the attachment applied thereto. Fig. 2 is a perspective view of the cotton chopper or attachment detached from the cultivator. Fig. 3 is a vertical sectional view through the cotton chopper or attachment illustrating the manner in which the shanks of the cotton chopper blades are fastened to the annular rings. Fig. 4 is a cross sectional view on the line 4—4 of Fig. 3. Fig. 5 is a perspective view of the adjustable bearing 16, which is also shown in Fig. 1 in side elevation. Fig. 6 is a detail sectional view through one of the blades 11 and its shank 8, showing the connection between the two.

Similar reference characters are used to indicate corresponding parts in the several illustrations.

In regard to the accompanying drawings 1 and 2 designate a pair of annular rings or rims, which are held spaced apart by means of a plurality of plates 3, bolted to the inner circumference of the said rings or rims as shown at 4. Extending through the said plates are the spokes 5 of the device, the inner ends of which are fixed to the hub of the apparatus, while near their outer ends the said spokes are provided with shoulders 6, which abut against the inner face of said plates; the extreme ends of said spokes are provided with nuts 7, so as to hold said spokes in their proper position.

Disposed between the said rings or rims are the shanks 8 of the said cotton chopper blades, which shanks are provided with nuts 9, one set of which engage the outer circumference of said rings or rims while another set engage the inner circumference of said annular rings or rims, as clearly shown in Fig. 2. The outer free ends of said shanks are provided with bifurcated portions $8^a$, forming arms $8^b$, between which the cotton chopper blades 11 are securely fixed by means of nuts and bolts 12, as will be clearly seen in Figs. 2 and 3. Said blades 11 are provided with projections $11^a$, which are received by the square sockets 10, as will be clearly seen in Fig. 6 of the drawings.

The hub of the device is provided with a shaft 13 which is journaled in suitable bearings 14, of the frame 15, which frame is used for supporting the said device. This frame is secured to the beam of the cultivator in any suitable manner, preferably by means of an adjustable bearing 16 which is carried by the said beam of the cultivator. The said frame is fastened to the frame by means of a shaft 17 having nuts upon each end thereof as shown at 18. To raise or lower the device so as to regulate its depth, a quadrant 19 is provided which is fastened to the beam of the cultivator, with which quadrant a lever 20 coöperates. This lever is provided with a pawl 21, designed to coöperate with ratchet teeth 22 upon the said quadrant; this pawl is operated through the medium of a pitman rod 23 and a hand grip 24, as clearly shown. The said lever is provided with a downward extension 25 to which the ends of a pair of pitman rods 26 are connected, the lower ends of which have pivotal connections with the lower portions of the frame 15 as clearly shown. It will be seen from the construction above described how the said device is raised or lowered.

Having thus described the invention, what is claimed as new and useful by the protection of Letters Patent is:

In a machine as set forth, the combination of a carrying frame and traction wheels therefor, of a chopping wheel, comprising a pair of annular rings spaced apart, a hub having spokes provided with reduced portions at their outer ends forming shoulders, plates bolted to the inner circumference of inner rings for holding the rings spaced apart, said plate having apertures to receive said reduced portions sufficiently to allow the shoulders to butt against said plates, said reduced portions having nuts threaded thereon to engage the outer circumference of the said rings, cotton chopper blades having shanks disposed in the space between the rings and provided with nuts disposed adjacent the inner and outer circumference of the rings to prevent displacement thereof, said shanks being movable within said space by loosening said nuts, said shanks having bifurcated ends for connection to the said cotton chopper blades, the said bifurcated ends forming arms to engage on either side of the blades, means passing through said arms and the blades for securing them firmly together, said bifurcated ends of the shanks having sockets 10 located between the said arms, said blades having projections to be received by said sockets, as and for the purpose specified.

In testimony whereof I have signed my name to this specification in the presence of two subscribing witnesses.

HENRY N. PATRICK.

Witnesses:
W. W. BOYD,
A. L. CAIN.